April 12, 1932.  W. E. URSCHEL  1,853,475
BEAN GRADER
Filed July 15, 1926   2 Sheets-Sheet 1
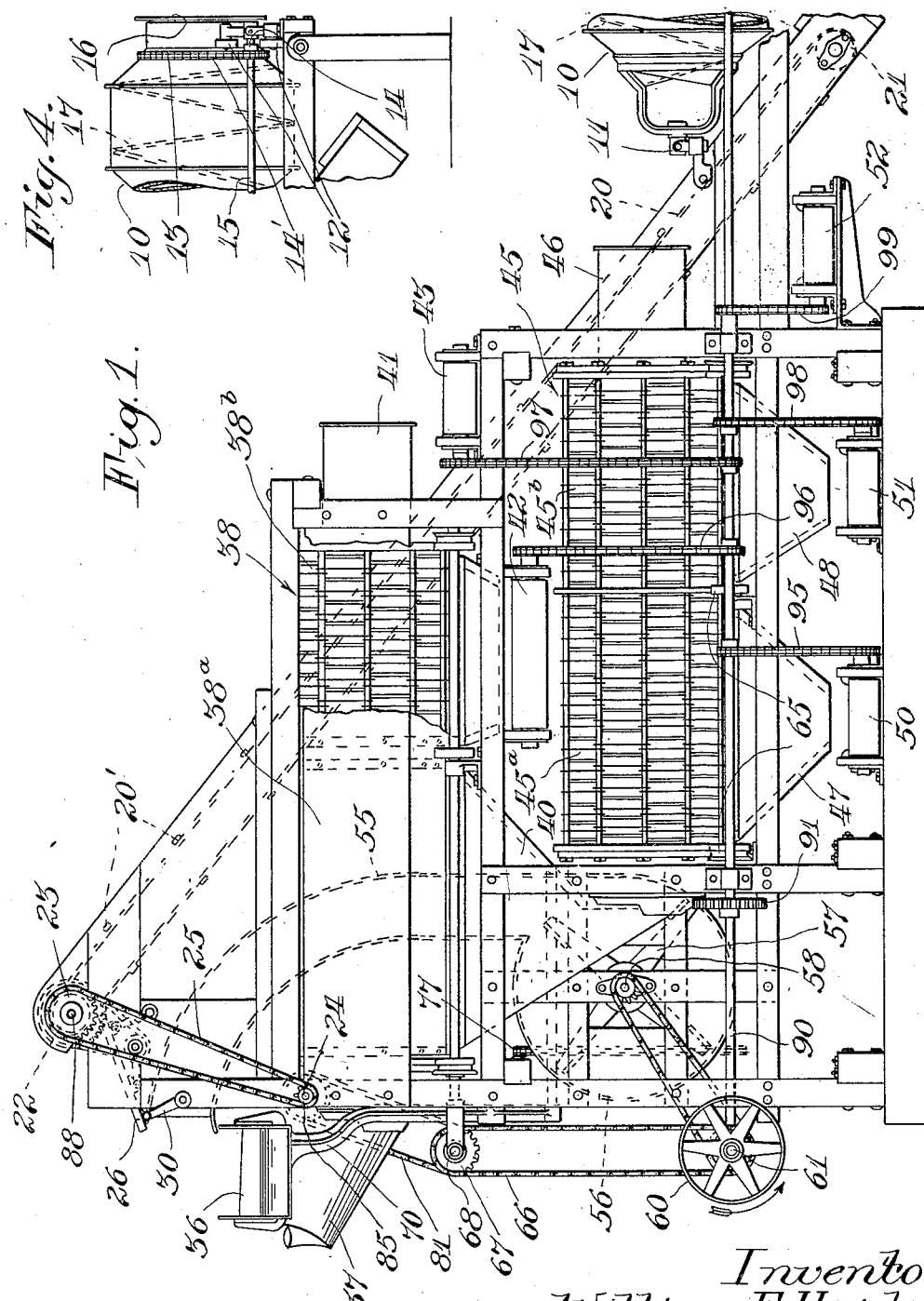
Inventor.
William E. Urschel,
By [signature]
Atty.

April 12, 1932. W. E. URSCHEL 1,853,475
BEAN GRADER
Filed July 15, 1926 2 Sheets-Sheet 2
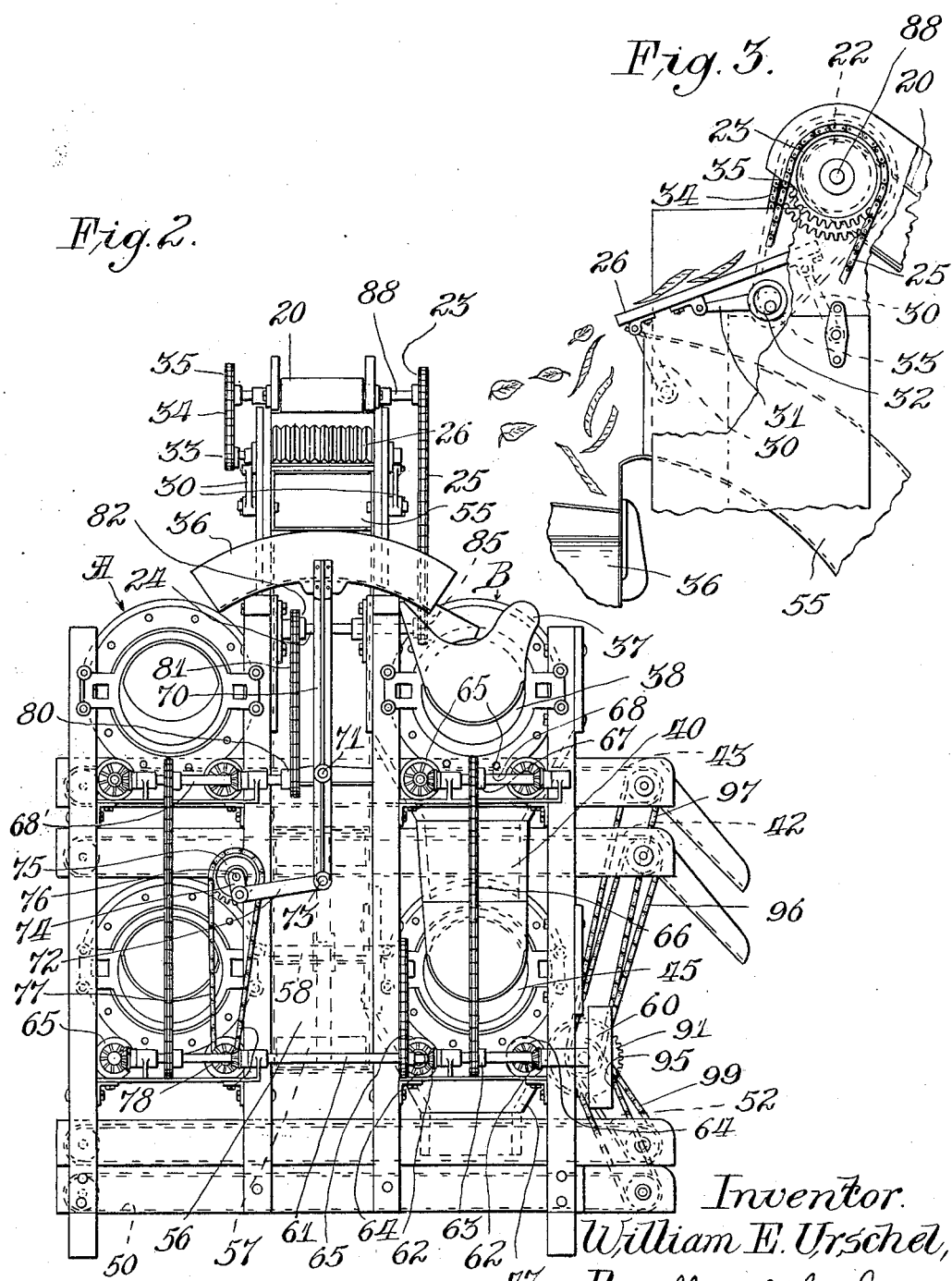

Patented Apr. 12, 1932

1,853,475

UNITED STATES PATENT OFFICE

WILLIAM E. URSCHEL, OF VALPARAISO, INDIANA

BEAN GRADER

Application filed July 15, 1926. Serial No. 122,559.

This invention relates to a bean grader, and has to do particularly with an improved type of grader whereby string beans and the like may be mechanically separated and graded into a number of sizes preparatory to canning.

The bean industry at the present time employs mechanical devices from the time of the planting of the beans to the marketing thereof. Marketing is either in bulk or in a preserved form, such as canned. The present invention perhaps is of particular interest where the beans are to be used for canning.

When the beans are harvested by machinery, as is usually the practice in large acreages, there are many sizes of beans gathered, from the smallest to the largest, and mixed therewith are portions of vines, leaves, and the like. It has long been the practice to separate the beans according to sizes, generally two, a grader for this purpose being shown in my Patent No. 1,295,642, issued February 25, 1919. This patented machine separates the beans into two sizes and is of very great utility in the industry.

Recently, however, the canners of beans have demanded that the beans be graded into a larger number of sizes or classes, it now being considered preferable to grade the beans into five sizes. The sizes are numbered 1 to 5, the number "1" size being the smallest, and the number "5" size the largest.

It is the object of the present invention to provide a machine whereby to separate string beans in respect to the greater number of sizes as desired by the canners.

A further object is the production of a machine which will receive string beans as they come from a harvesting machine, remove all foreign matter therefrom, and finally mechanically grade the beans into the sizes required.

A machine constructed in accordance with the present invention includes a feed hopper into which the beans are placed and an elevating belt which receives the beans from the hopper and elevates them to a shaker frame, whence they are caused to drop to a feed spout which distributes them to the grading parts. Means is provided whereby a draft of air is blown across the beans as they drop from the shaker frame, whereby to remove all foreign matter, such as leaves. The beans being of greater weight than the usual foreign matter encountered are undisturbed in their fall by the blast of air.

The first grading cylinder which the beans encounter comprises two parts. Through the first part of this cylinder the three smallest sizes of beans are discharged, and through the second portion of this member, the next to the largest size are discharged. The largest size of beans are discharged out the end of the cylinder. Both the number "5" or any larger size, and the number "4" size, fall onto separate continuous conveying belts, from whence they are deposited into proper receptacles.

The three smaller sizes of beans drop into a chute which feeds them into a second grading cylinder, this second grading cylinder also having two sections. Through the first encountered section of the cylinder, the smallest size beans are discharged, and as the remaining beans proceed toward the end of the cylinder, they reach the second section of such cylinder, from whence the number "2" size of beans are discharged. The number "3" size are conveyed to the extreme end of the cylinder and are discharged out of such end through a spout provided for the purpose. The three sizes of beans separated by the second cylinder drop onto separate continuous conveyor belts, and are conveyed thereby to properly placed receptacles.

The grader is built in two units of separators, or in tandem, both units being supplied from the same hopper and belt elevator, the beans being divided by the distributing spout referred to above, whereby they are fed in substantially equal quantities to the two units.

The invention will be more fully understood by the following detailed description taken with the accompanying drawings, wherein Figure 1 is a side elevation of a bean grader constructed in accordance with the present invention;

Figure 2 is an end elevation of the same machine looking from the left-hand side of Figure 1; and Figure 3 is an enlarged view of the shaker and distributing spout, and shows the manner in which foreign matter is removed from the beans.

Figure 4 is a side elevation of the feeding means as an extension of the view of Figure 1.

In the description which follows, like reference characters are used throughout to designate similar members.

Although I have shown a great many details of a machine which embodies the invention, I have not gone into great length concerning some of the structural features which are purely matters of ordinary mechanical skill, and which if described, would not make the disclosure any more clear, but on the contrary would tend to obscure by voluminous discussion of unessential matters the description of the actual invention.

In the interest of clearness, I will first describe the main portions of the mechanism, referring thereto in the order in which the beans reach the same. I will not refer in detail to the manner of driving the different members until the latter part of the description, and when describing the motive means I shall proceed from the source of power.

As Figure 2 shows, the machine is made in two units in tandem which I designate A and B, both of said units being practically identical. For the sake of brevity, therefore, I will describe the machine generally as if it constituted only a single unit.

Beans to be graded are preliminarily placed in a hopper 10 (Figure 1) supported by a bearing 11 at one end thereof and a pair of travelers 12 at the other end thereof. Said hopper 10 is provided with a continuous gear 13 which is connected by means of a chain 14' with a gear 14 keyed to a shaft 15.

The hopper 10 is open at each end. Beans are fed in the opening at the right-hand side (Figure 4) designated 16, and are carried forward (to the left, Figure 1) by a feeding baffle 17. The beans are thus deposited on a continuous traveling feeder belt 20, moving over pulleys 21 and 22. A sprocket gear 23 is secured integrally with said pulley 22 and is linked with a gear 24 by a chain 25. Cleats 20' may be provided on the belt 20 to provide shelves or ridges to prevent the beans from slipping therefrom and to increase the capacity of the belt as a carrier.

From the upper part of the feeder belt 20 the beans are deposited onto a shaker frame 26, which shaker frame (Figure 3) is supported on a plurality of pivoted legs 30. Said shaker frame 26 receives its motion through a link 31 secured to an eccentric 32, driven by gear 33, chain 34, and gear 35, the gear 35 being designed to rotate with the pulley 22.

After the beans are shaken from shaker frame 26, they are deposited by gravity on a feeder chute or distributor 36 from whence they are fed in substantially equal numbers or parts to the two units of the machine.

From the feed chute or distributor 36, the beans are deposited into a spout 37, on either side of the machine, from whence they are carried to a grading cylinder 38, the grading cylinder 38 being divided into two portions, designated 38a and 38b, respectively. It will be recalled that the grading parts of the machine comprise two units, both working from the same source of power, but otherwise entirely separate.

The grading cylinder 38 may be constructed in any proper manner, but I prefer to employ substantially the same construction as shown in my Patent Number 1,295,642, referred to above. I have not shown the grading cylinder in detail because it can be readily understood from an inspection of the drawings taken into consideration with the patent referred to above.

The usual openings, of course, are provided in the grading cylinder 38, whereby beans of a certain size are permitted to drop through, while beans of a larger size are retained within the cylinder. I have designed the portion 38a so that the three smaller sizes, numbered "1", "2", and "3", will be discharged therethrough into a feed spout 40. The two larger sizes, "4" and "5", are carried over into the portion 38b, and this portion of the grading cylinder is so designed that the smaller of these two sizes, namely, the number "4" size, will be permitted to drop therethrough, while the larger size, namely, the number "5" size, are carried to the end of the cylinder 38 and discharged out through the chute 41. The number "4" size beans discharged through the mesh of the section 38b are deposited onto a continuous conveyor belt 42, while the number "5" size are deposited onto a conveyor belt 43.

I contemplate any suitable means for causing the beans to be carried from end to end of the grading cylinder. For instance, I place the cylinder at an angle and the beans sequentially fall from one subdivision to another, due to the tilting of the cylinder. I may place the rings of the cylinder on a bias or employ a feeding baffle, depending on the specific construction employed. Where I employ a cylinder of the usual form, it is probably best to place the rings on a bias.

From the feed spout 40, the smaller sizes of beans are fed into a second grading cylinder 45, which cylinder 45 also has two sections, these being designated 45a and 45b. The section 45a is constructed so that only the smallest sizes of beans, the number "1" size, pass through the mesh thereof. The section 45b is arranged so that the number "2" size beans will pass therethrough, while the number "3" size beans are carried to the end of the cylinder 45 to be discharged out a discharge chute 46 at the end thereof.

Beneath the sections 45a and 45b are depending discharge orifices designated 47 and 48.

For each of the three smaller sizes of beans, separated through the agency of cylinder 45, a continuous conveyor belt is also employed, said conveyor belts being designated for sizes 1 to 3, respectively, by the reference characters 50, 51, and 52. Any proper type of a receptacle (not shown) may be so placed as to receive the beans when they are discharged from these conveyors.

Between the shaker frame 26 and the feed chute 36, the open end of an air conduit 55 is disposed, said conduit 55 communicating directly with a fanning mill 56. The fanning mill 56 contains a fan 57 secured on a shaft 58, for providing an outward flow of air at the mouth of conduit 55.

It will be thus seen that a blast of air is directed through the beans as they fall from the shaker frame 26. The beans being heavy are slightly affected by the blast, but portions of vine and other foreign matter which are lighter than the beans, will be blown away, leaving only the beans to reach the chute 36.

An examination of the instrumentality, as illustrated, will show that there are a large number of moving parts to the machine. I contemplate driving all of these parts in an improved and convenient manner. In the embodiment of the device shown in the drawings, the drive is through a pulley 60. All of the other portions of the mechanism are driven through this single means.

A belt (not shown) is designed to engage the pulley 60 and to communicate with any suitable source of power (not shown). The pulley 60 is keyed or otherwise securely mounted on a shaft 61. Said shaft 61 carries bevel gears 62—62 and sprocket gears 63—63. The bevel gears 62 mesh with bevel gears 64, mounted on the same shaft with travelers 65 and which serve to drive the grading cylinder 45.

One of the sprocket gears 63 is engaged by a chain 66 which communicates with a sprocket gear 67 on an upper shaft 68. The upper shaft 68 is provided with the same species of bevel gearing as has just been described communicating with the same type of travelers and drives the grading cylinder 38 in the same manner as set forth in connection with the grading cylinder 45.

The feed chute 36, the function of which has been described above, is mounted on a vertical support 70, which is pivoted at 71. To facilitate action of the feed chute 36, I provide an arrangement whereby it may be agitated, and such arrangement includes a crank arm 72 secured by means of a pivot 73 at the bottom of said vertical support 70.

The crank arm 72 is pivotally secured to a crank 74, which turns integrally with a sprocket gear 75 mounted on a short shaft 76. The sprocket 75 is driven by a sprocket chain 77 and a small sprocket gear 78 secured on a stub shaft driven from the main transverse shaft 61.

As pointed out in the preliminary part of this specification, the two units of the machine are substantially identical. Obviously, therefore, unit A has a shaft which I designate 68' for purposes of identification only, which shaft 68' is identical in its function with the shaft 68 previously described in connection with the unit B.

At the end of said shaft 68' is provided a sprocket gear 80 which drives a chain 81, which in turn drives an upper sprocket gear 82 keyed to the transverse shaft 24 previously referred to. The shaft 24 is journalled in any suitable bearings and is provided with a sprocket gear 85 at the end thereof, which sprocket gear 85 drives the sprocket chain 25. Chain 25 communicates its motion through the sprocket gear 23 to an upper transverse shaft 88, on which the pulley 22 and the sprocket gear 23 are mounted.

Through this mechanism it is obvious that the conveyor belt 20 will be actuated in accordance with its function. The pulley 22 being driven in the manner described, it is obvious that the mechanism previously described in connection with the shaker frame 26 will produce a longitudinal reciprocation of this member.

The lower right-hand bevel gear 64, instead of having the usual short stub shaft which is shown in the remaining positions, is provided with an elongated shaft (Figure 1) indicated by the reference character 90. This shaft, through suitable gearing indicated at 91, drives the longitudinal shaft 15 which has been previously referred to. Through the shaft 15 by suitable chains and associated gearing, which I designate for purposes of identification by the numbers 95 to 99, inclusive, the several conveyor belts designated 50, 42, 43, 51, and 52 respectively, are driven. Rotation of the shaft 15 also results in a rotary motion of the hopper 10, the associated gearing having been previously described.

The operation of the machine is as follows. Beans to be graded are placed in the hopper 10, where they are agitated and carried toward the front end of the hopper by means of the feeding baffle 17. They are discharged out through the front of the hopper in uniform sequence and deposited on the cleated belt 20. The belt 20 carries them forwardly and upwardly at a uniform speed and drops them onto the shaker frame 26. From the shaker frame 26 they drop to the feed chute 36, and while falling a blast of air from the funnel 55 passes through the beans whereby all foreign matter, such as leaves and the like, is removed. The beans are further agitated on the feed chute 36, from which they are fed in equal quantities, and in separated batches, to the units A and B of the grader.

Discussing only the unit B which is shown in side elevation in Figure 1, (unit A being the same mechanically) the beans drop to the feed spout 37, whence they are deposited in the grading cylinder 38. In the section 38a of cylinder 38, the three smaller sizes are discharged through the suitably arranged "mesh" and the balance of the beans are carried on to the section 38b. At 38b the number "4" size of beans drop onto the belt 42, whence they are conveyed to a suitable receptacle, while the number "5" size of beans are discharged out through discharge chute 41 and dropped onto the conveyor 43.

When the three smaller sizes of beans drop through section 38a, they are conveyed by the feed spout 40 to the grading cylinder 45, whence through the same general arrangement as in the grading cylinder 38 the number "1" size beans are discharged through the portion 45a and dropped onto the conveyor belt 50. The number "2" size beans are discharged through the section 45b and dropped onto the conveyor 41, while the number "3" size of beans, the largest size of beans to enter the cylinder 45, is discharged through the discharge chute 46 and dropped onto the conveyor belt 52. It is obvious that any usual form of container may be provided to receive the beans as they are dropped from the individual conveyor belts.

Although for purposes of description many features of the machine embodying the present invention have been referred to somewhat in detail, it is obvious that I do not limit myself to the precise form illustrated and described, the invention being restricted only in accordance with the scope of the appended claims.

I claim:

1. A bean grader comprising a unit having as a part thereof a number of like series of screens of different sizes for dividing beans into a plurality of classes, a conveyer feeding beans continuously to said unit, and a distributor timed for movement with said conveyer for diverting the beans from said conveyer to each series of screens one at a time periodically.

2. A bean grader comprising a unit having as a part thereof two like series of rotatable screens of different sizes for dividing beans into different classes, a conveyor feeding beans continuously to said unit, and a distributor arranged for movement with said conveyer adapted to divert beans alternately to each series of screens.

3. A bean grader comprising a unit having as a part thereof two like series of rotatable screens of different size for dividing beans into different classes and arranged in parallelism, a conveyor feeding beans continuously to said unit, a distributor comprising a trough adapted to receive beans from said conveyor and discharge them from its ends, and means for oscillating said trough in timed relation with the movement of said conveyor to discharge beans alternately at its opposite ends and into different series of screens.

4. A bean cleansing instrumentality comprising a conveyor for distributing beans over a wide flat surface during which the beans are generally separated one from another and from the end of which conveyor the beans are discharged by gravity, a shaker with an arcuate top surface and adapted to move transversely of said conveyor, said conveyor being adapted to discharge its stream of beans at or upon the crown of said shaker, means for oscillating said shaker beneath and across the end of said conveyor, and a blower for forcing a blast of air through said stream of beans while falling from said conveyor to said shaker.

WILLIAM E. URSCHEL.